United States Patent [19]

Obama et al.

[11] Patent Number: 4,573,093

[45] Date of Patent: Feb. 25, 1986

[54] DISC CASSETTE LOADING APPARATUS

[75] Inventors: Yoshiaki Obama, Chigasaki; Shojiro Asami, Atsugi, both of Japan

[73] Assignee: Sony Corporation, Tokyo, Japan

[21] Appl. No.: 405,575

[22] Filed: Aug. 5, 1982

[30] Foreign Application Priority Data

Aug. 10, 1981 [JP] Japan .............................. 56-118664[U]

[51] Int. Cl.[4] ............................................. G11B 5/012
[52] U.S. Cl. ........................................ 360/97; 360/99
[58] Field of Search ................. 360/86, 93, 96.1, 96.5, 360/96.6, 97, 99, 133

[56] References Cited

U.S. PATENT DOCUMENTS

| 3,593,327 | 7/1971 | Shill | 340/174.1 |
| 3,845,502 | 10/1974 | Paus | 360/86 |
| 3,899,794 | 8/1975 | Brown, Jr. | 360/133 |
| 4,208,681 | 6/1980 | Hatchett | 360/97 |
| 4,295,169 | 10/1981 | Iwata et al. | 360/96.5 |

Primary Examiner—John H. Wolff
Attorney, Agent, or Firm—Hill, Van Santen, Steadman & Simpson

[57] ABSTRACT

In a floppy disc cassette loading apparatus, a cassette holder is moved between loading and unloading positions. In order to prevent an erroneous ejection of a floppy disc cassette from the cassette holder, a cassette ejection arm is unlocked after the cassette holder is lifted up to a predetermined position.

7 Claims, 13 Drawing Figures

DISC CASSETTE LOADING APPARATUS

BACKGROUND OF THE INVENTION

The present invention relates to a disc cassette loading apparatus of a recording and/or reproducing apparatus and more particularly to a mechanism for ejecting a cassette from a cassette holder adapted to rise and fall between an unloading position and a loading position.

It has been known to provide a recording and/or reproducing apparatus of the type in which a disc cassette comprising a cassette housing formed of a flat synthetic resin and a flexible magnetic disc (so-called magnetic sheet) is loaded on the recording and/or reproducing apparatus. The magnetic disc is rotated at a high speed within the cassette housing and at the same time a magnetic head is brought into contact with a magnetic surface of the magnetic disc while being moved in the radial direction of the magnetic disc to record or reproduce video, audio, or digital signals. In such a conventional recording and/or reproducing apparatus, usually the disc cassette is held by a cassette holder and is moved together with the holder from an unloading position to a loading position. When the disc cassette has been disposed in the loading position, the magnetic head comes into contact with the magnetic surface of the magnetic disc to perform recording or reproducing. The cassette is ejected by depressing an eject button, that is, depression of the eject button causes the cassette holder to rise from the loading position to the unloading position, whereupon the cassette is ejected from the cassette holder.

In the conventional disc cassette loading apparatus, however, the cassette ejecting operation is often started before the cassette holder completely reaches the unloading position. Consequently, serious drawbacks are encountered therein. For example, the cassette held within the cassette holder strikes against the inside surface of a front panel and is held therebetween. Or when the eject button depressing operation is stopped before the button is completely depressed, the cassette holder is urged in the descending direction despite the cassette being partially ejected to the outside from the front panel, thus making it impossible to pull out the cassette from the cassette holder. Also, in the latter case, if the cassette projecting from the front panel is pulled out forcibly from the cassette holder while holding a part of it with one's fingers, it is very likely that the pad and the magnetic head will be rubbed and damaged by the cassette housing.

SUMMARY OF THE INVENTION

It is an object of the present invention to provide a new floppy disc cassette loading apparatus.

It is another object of the present invention to provide a floppy disc cassette loading apparatus capable of flawlessly loading and/or unloading a floppy disc cassette.

It is a further object of the present invention to provide a new floppy disc cassette loading apparatus wherein a disc cassette is lifted up to a predetermined position by a guide surface formed on an eject lever, and then is ejected by a cassette eject arm.

For achieveing these objects, a disc cassette loading apparatus according to the present invention comprises a main chassis on which is provided a disc rotating and transducing mechanism. A cassette holder accepts a disc cassette and is movable between a loading position and unloading position relative to said disc rotating and transducing mechanism on said main chassis. An eject arm is provided on said cassette holder for urging said disc cassete for withdrawal from said cassette holder. A lock arm is provided in association with said eject arm for preventing the movement of said eject arm until said cassette holder is raised up to a predetermined position.

The apparatus is constructed so that if an eject lever is moved under pressure when the cassette holder is placed in the loading position, the cassette holder is lifted up to the unloading position by a guide surface. Along with subsequent further movement under pressure of the eject lever, the eject arm and the lock arm are disengaged from each other and the eject arm is pivoted in a predetermined direction by an urging force of a biasing means. The disc cassette is thus urged by a cassette engaging portion of the eject arm and is ejected from the cassette holder. Thus, in the disc cassette loading apparatus in a recording and/or reproducing apparatus according to the present invention, the cassette ejecting operation is started after the cassette is completely lifted from its loading position up to its unloading position. Therefore, the cassette ejecting operation can be flawlessly performed without causing accidents such as for example, the cassette striking against the front panel and causing the cassette holder to be no longer movable, or it becomes impossible to draw the cassette out from the cassette holder.

Other objects and advantages of the invention will become apparent from the following detailed description taken in connection with the accompanying drawings.

DETAILED DESCRIPTION OF THE PREFERRED EMBODIMENTS

Figure 1:
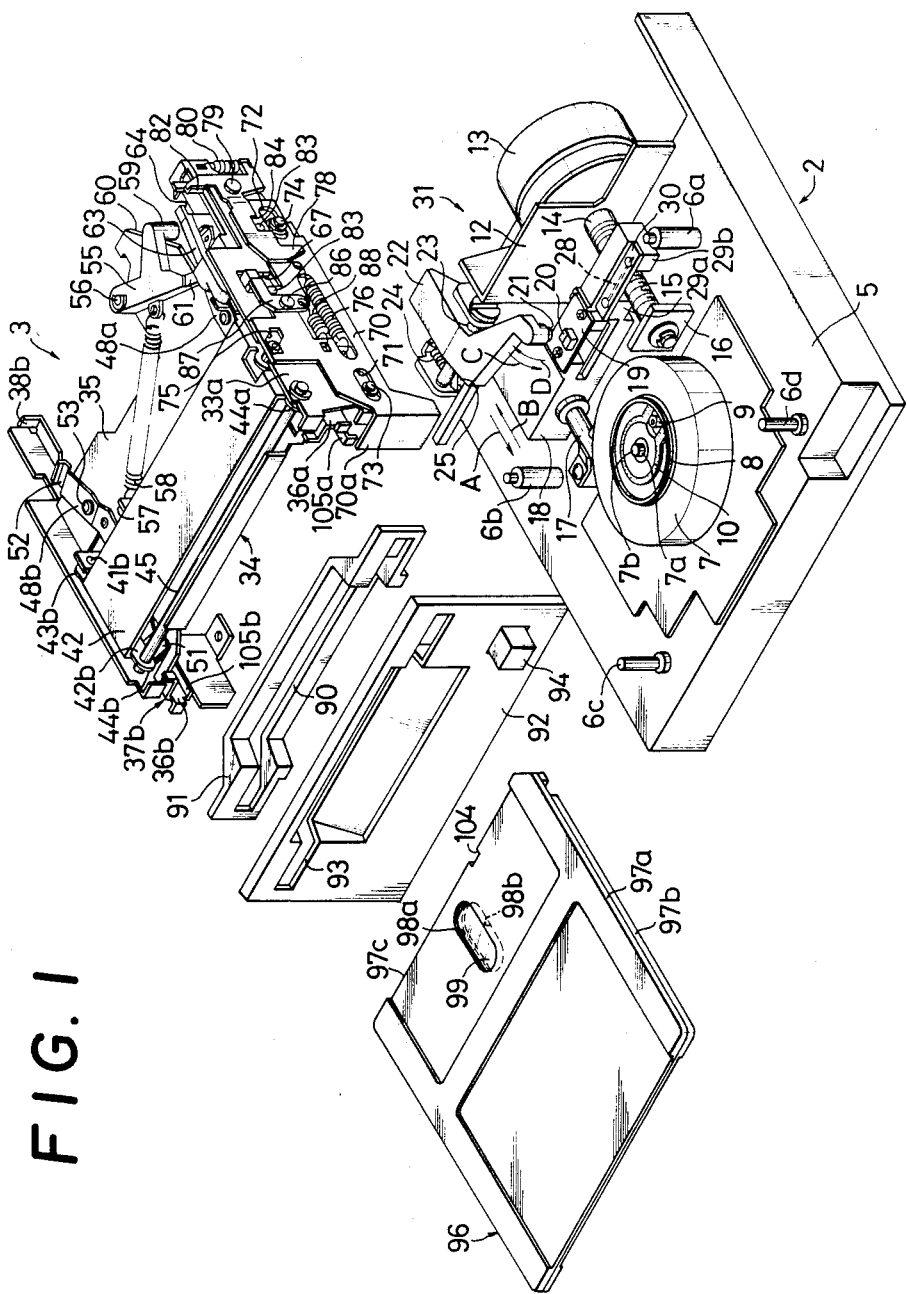
FIG. 1 is an exploded perspective view of a recording and/or reproducing apparatus.

Referring first to FIG. 1, there is shown a recording and/or reproducing apparatus 1, which comprises a drive and transducing apparatus 2, and a cassette loading apparatus 3 mounted thereon. The drive and transducing apparatus 2 has a chassis 5 on which are mounted, for example, four cassette receiving pins 6a, 6b, 6c and 6d, and in a square area surrounded with the pins 6a through 6d there is nearly centrally disposed a flat brushless motor 7. The brushless motor 7 has a motor shaft 7a on which is integrally mounted a rotary disc 8. On the rotary disc 8 are mounted a drive pin 9 and a magnet 10.

A vertical member 12 is mounted on the chassis and a stepping motor 13 is attached to the vertical member 12. A motor shaft of the stepping motor 13 is connected to one end of a lead screw 15 through a coupling 14, the other end of the lead screw 15 being rotatably supported by a vertical member 16 mounted on the chassis 5.

Figure 3:
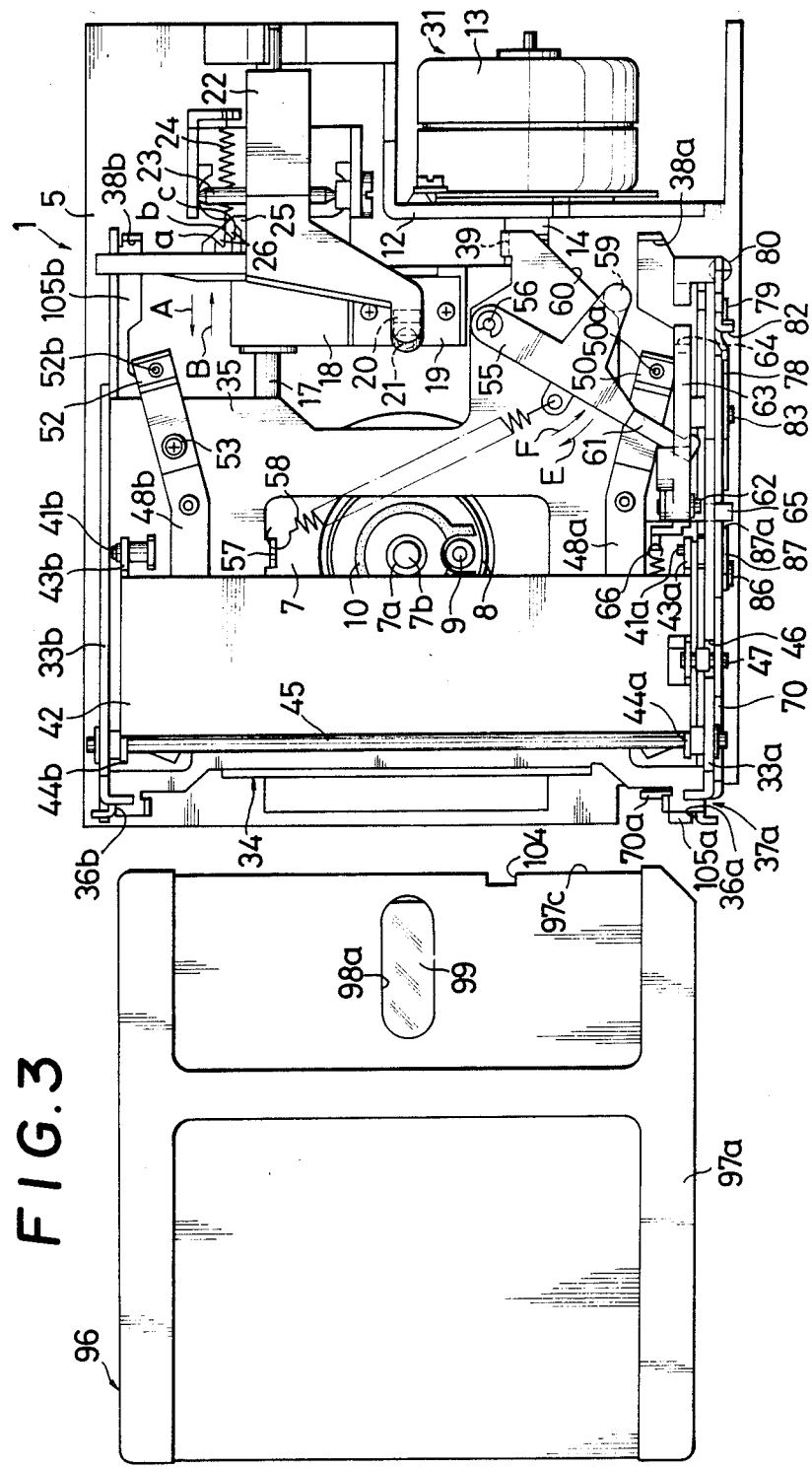
FIG. 3 is a plan view of the recording and/or reproducing apparatus.

On the chassis 5 is disposed a guide shaft 17 in parallel with the lead screw 15, and a head assembly base 18 is adapted to move in the directions of arrows A and B in FIGS. 1 and 3 while being guided along the guide shaft 17. To the head assembly base 18 is fixed a magnetic head 20 on a head mounting plate 19, and a pad arm 22 which supports a pressure pad 21 is also mounted on the head assembly base 18 so as to be pivotable in the directions of arrows C and D about a pivot shaft 23. The pad arm 22 is normally urged in the direction of arrow C by means of a coil spring 24, but at the time of unloading of the cassette it is moved so that the pad 21 is placed in a position away from the magnetic head 20. In this embodiment, moreover, the drive and transducing apparatus 2 is constructed so that the pivoting force of the pad arm 22 based on the bias of the coil spring 24 can be varied if required. That is, as shown in FIGS. 1 and 3, the pad arm 22 has, for example, three saw-toothed projections 26 formed integrally with a portion 25 which is inclined with respect to the pivot shaft 23, and by changing the achoring point of one end of the coil spring 24 among points a, b and c (see FIG. 3), it is possible to adjust the biasing force of the coil spring 24.

A needle member 28 extends between a pair of opposed portions 29a and 29b of the head assembly base 18 in an engaged state between threads of the lead screw 15, and is held in place by a hold plate 30. The stepping motor 13, the lead screw 15, and the needle member 28 constitute a track selecting mechanism 31. Along with each step movement of the stepping motor 13 the magnetic head 20 and the pressure pad 21 are moved intermittently in the direction of arrow A or B for track selection.

Figure 2:
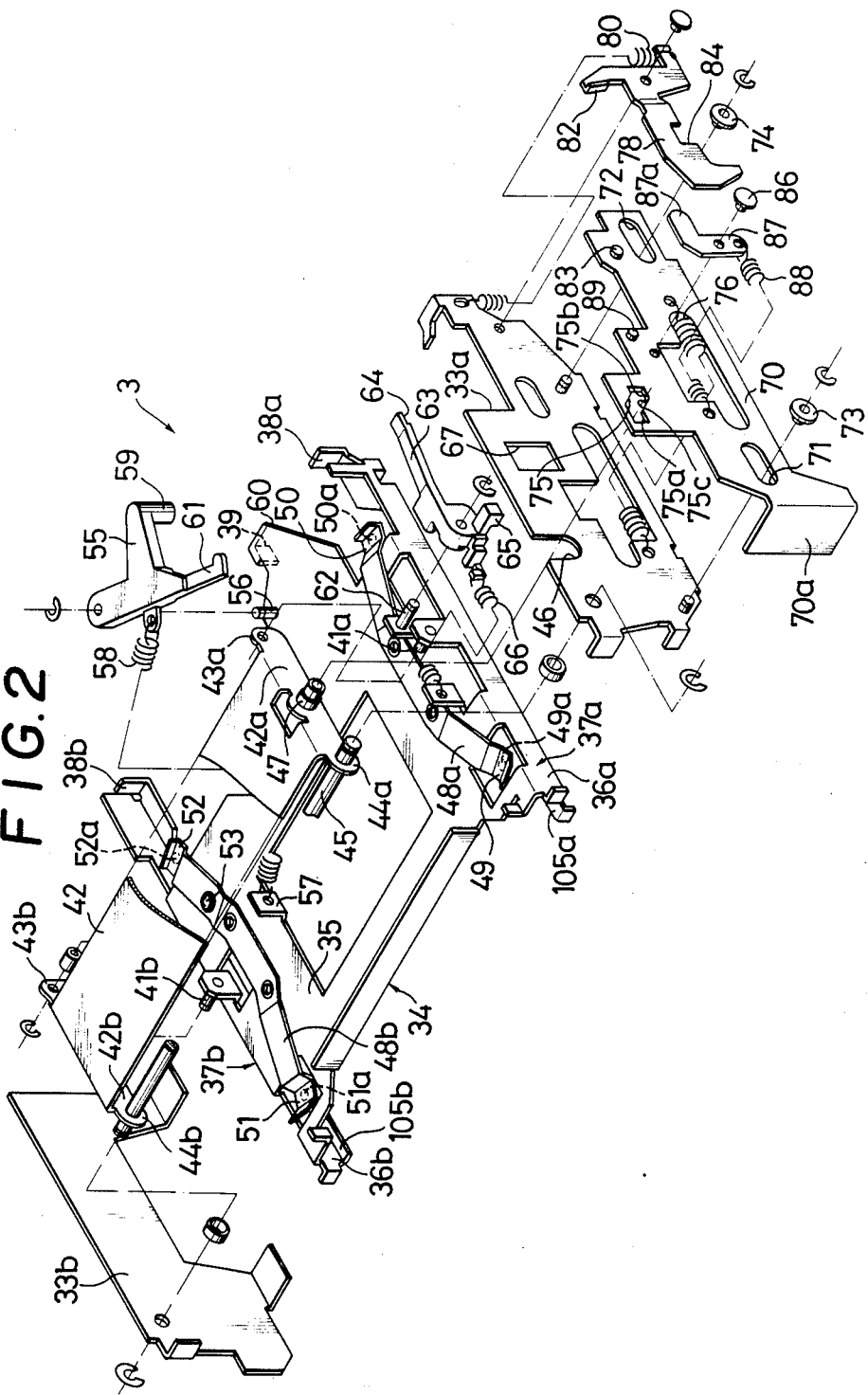
FIG. 2 is an exploded perspective view of a cassette loading apparatus according to the invnetion.

On the other hand, the cassette loading apparatus 3, as shown in detail in FIG. 2, is provided with a pair of side walls 33a and 33b which are fixed by screws to the chassis 5 of the drive and transducing apparatus 2 in opposed relation with each other. Between the side walls 33a and 33b is disposed a cassette holder 34 so as to be vertically movable, namely, for rising and falling motion therebetween. The cassette holder 34 is formed, for example, by bending a sheet of iron plate, and it comprises an upper plate portion 35 and side portions 36a and 36b of an L-shaped section formed on both sides of the upper plate portion 35. Therefore, both side portions of the cassette holder 34 are provided substantially in the form of a channel section to form portions 37a and 37b, each having a channel-shaped section. When loading a disc cassette 96, both side portions thereof are inserted and disposed within the portions 37a and 37b. In FIG. 2, the reference numerals 38a and 38b designate stoppers for preventing the disc cassette 96 from moving in the direction of insertion, and numeral 39 designates a member for detecting an erroneous installation of the disc cassette 96.

A pair of shafts 41a and 41b are fixed to the cassette holder 34, and rear end portions 43a and 43b of side walls 42a and 42b formed on both sides of a connecting plate 42, are pivotably attached to the fixed shafts 41a and 41b, respectively, while front end portions 44a and 44b of the side walls 42a and 42b are pivotably mounted on a connecting rod 45 extending between the side walls 33a and 33b. In an intermediate portion of the side wall 42a is provided a guide roller 47 which projects outward through a notched portion 46 formed in the side wall 33a.

Figure 4:
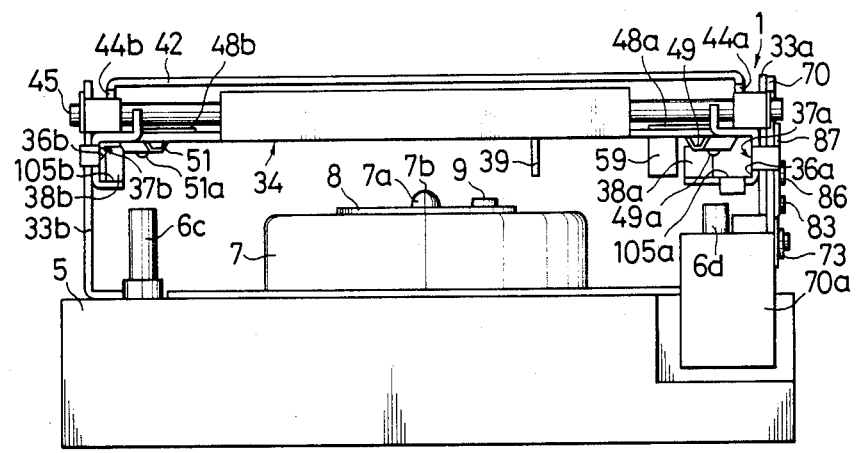
FIG. 4 is a front view of the apparatus of FIG. 3.

On the other hand, a pair of plate springs 48a and 48b are mounted on both side portions of the top surface of the upper plate portion 35 of the cassette holder 34. As shown in FIGS. 2 and 4, trapezoidal bent portions 49, 50 and 51, 52 are formed at both end portions of the plate springs 48a and 48b, respectively, and are projected downwards from the lower surface of the upper plate portion 35 of the cassette holder 34. On nearly central portions of the bent portions 49 through 52 are formed engaging projections 49a through 52a, respectively. Furthermore, an adjusting screw 53 is attached to one plate spring 48b so that by turning the screw 53, the urging force (spring force) of the engaging projection 52a against the disc cassette 96 can be adjusted.

On the top surface of the upper plate portion 35 of the cassette holder 34, an eject arm 55 is pivotably mounted on a pivot shaft 56 and it is normally urged pivotally in the direction of arrow E in FIG. 3 about the pivot shaft 56 by the biasing force of a coil spring 58. The eject arm 55 is provided with a cylindrical cassette engaging portion 59 which extends perpendicularly downwards from the upper plate portion 35. A pivotal movement in the direction of arrow E of the eject arm 55 by virtue of the coil spring 58 is restricted by an inclined portion 60 of the upper plate portion 35. Furthermore, the eject arm 55 is provided at its tip end portion with an unlock arm 61, while on the upper plate portion 35 a lock arm 63 is mounted on a pivot shaft 62 in corresponding relation to the eject arm 55 so as to be pivotable in the directions of arrows G and H in FIG. 5. The lock arm 63 is provided at its tip end portion with a stepped portion 64 and at a side portion thereof with an integrally formed projection 65. It is normally pivotally urged in the direction of arrow G in FIG. 5 by means of a coil spring 66 stretched between it and the upper plate portion 35. The unlock arm 61 of the eject arm 55 is constructed so as to be pivotable in sliding contact with the lower surface of the lock arm 63. The projection 65 projects outward through an opening 67 formed in the side wall 33a.

Disposed adjacent the side wall 33a is an eject lever 70 in which are formed long apertures 71 and 72. By virtue of a guiding action of the long apertures 71, 72 and rollers 73, 74, the eject lever can slide in the direction of arrows I and J in FIG. 5. In the eject lever 70, as clearly shown in FIG. 5, there is formed a guide surface 75 in the shape of a through hole comprising a pair of parallel portions 75a as a loading surface and 75b as an unloading surface extending in parallel in the directions of arrows I and J in positions different in height from each other. An inclined portion 75c as a slant surface is provided between the parallel portions 75a and 75b. Within the guide surface 75 is inserted and disposed the guide roller 47. Under such a state, the eject lever 70 is normally urged in the direction of arrow I (cassette ejecting direction) by means of a coil spring 76 stretched between it and the side wall 33a.

Figure 5:
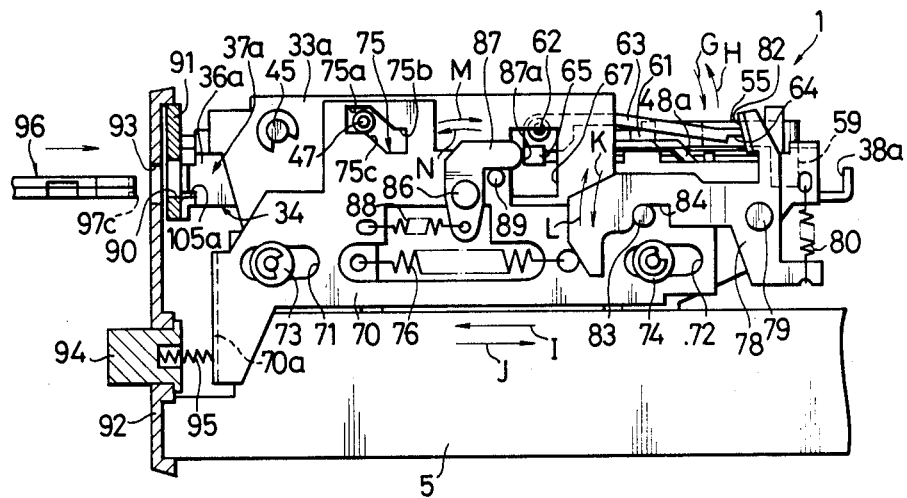
FIG. 5 is a side view of the apparatus of FIG. 3.

To the rear end side of the side wall 33a is pivotably attached a lock plate 78 through a pivot shaft 79, the lock plate 78 being normally urged pivotally in the direction of arrow K in FIG. 5 by means of a coil spring 80 stretched between the lock plate 78 and the side plate 33a. The lock plate 78 is provided with an urged portion 82 adapted to be urged when the eject arm 55 and hence the unlock arm 61 are pivoted in the direction of arrow F (see FIG. 3). Lock plate 78 is further provided with a recess 84 adapted to engage an engaging pin 83 fixed to the eject lever 70. Furthermore, an L-shaped unlock plate 87 is pivotably mounted on a pivot shaft 86 which is fixed to the eject lever 70, and it is normally pivotally urged in the direction of arrow M in FIG. 5 by means of a coil spring 88 stretched between the unlock plate 87 and the eject lever 70. A pivotal movement in the direction of arrow M of the unlock plate 87 is prevented by a stopper pin 89 fixed to the eject lever 70.

As shown in FIGS. 1 and 5, a cassette guide member 91 having an aperture 90 for insertion of the cassette is attached integrally to the front end side of the cassette holder 34, and a front panel 92 is attached to the chassis 5 of the drive and transducing apparatus 2. As shown in FIG. 5, moreover, an eject button 94 is attached to the front panel 92 so that when pushed it can press an urging portion 70a of the eject lever 70, the urging portion 70a being formed of a bent piece. Numeral 95 in FIG. 5 designates a coil spring for returning the eject button 94.

Figure 6:
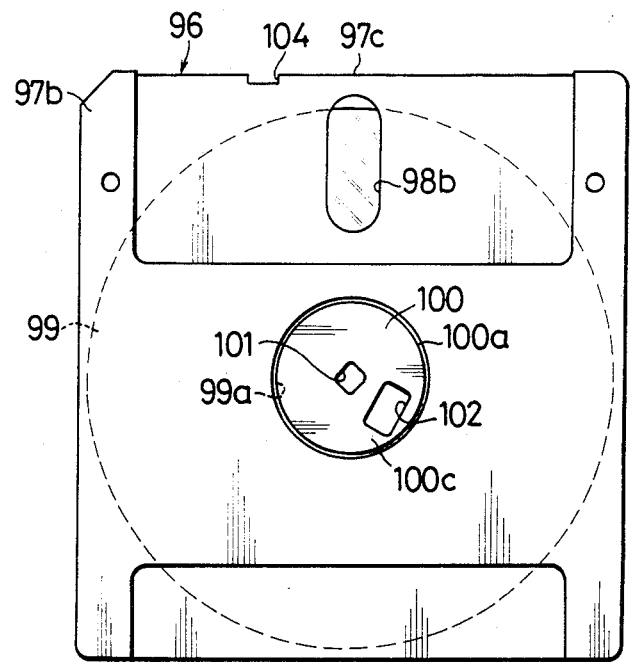
FIG. 6 is a rear view of a disc cassette.
Figure 7:
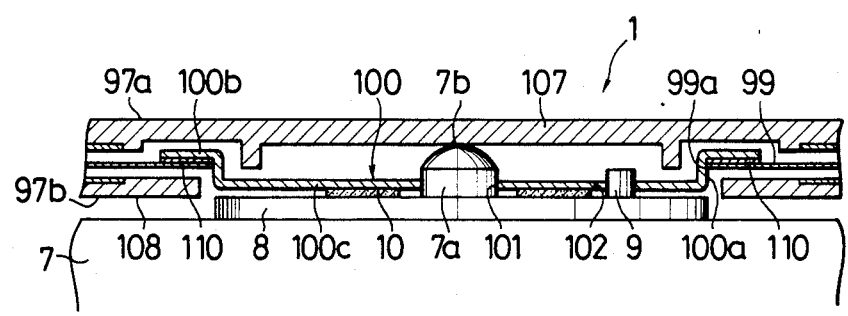
FIG. 7 is a sectional view showing a mounted state of the disc cassette on the recording and/or reproducing apparatus.

The disc cassette 96, which is in the form of a flat rectangular parallelopiped, is loaded to the recording and/or reproducing apparatus 1, and a predetermined recording or reproducing operation is performed. The disc cassette 96 has a cassette housing 97 obtained by welding together an upper half 97a and a lower half 97b both made of, for example, a synthetic resin. Within the cassette housing 97 is rotatably accommodated a flexible magnetic disc (magnetic sheet) 99. In the upper half 97a and the lower half 97b, as shown in FIGS. 1 and 6, there are formed a pad insertion aperture 98a and a head insertion aperture 98b, respectively in vertically opposed positions. In a predetermined position (except the central part) of a front end face 97c of the cassette housing 97 there is formed an erroneous installation detecting recess 104. On the other hand, as shown in FIGS. 6 and 7, a circular aperture 99a is centrally formed in the magnetic disc 99, and a convex portion 100a of a plate-like core member 100 is fitted in the aperture 99a. In this state the peripheral edge portion of the aperture 99a is bonded to a flange 100b of the core member 100 by means of a double-coated adhesive tape 110. Furthermore, in the central part of a lower surface 100c of the core member 100 is formed a motor shaft insertion aperture 101, and in a position biased from the insertion aperture 101 there is formed a drive pin insertion aperture 102.

The following description is now provided concerning the operation for performing recording or reproducing after loading the disc cassette 96 into the recording and/or reproducing apparatus 1 having the hereinabove described construction.

First, reference will be made to the state before inserting the disc cassette into the cassette holder 34. In this state, as shown in FIG. 5, the engaging pin 83 is in engagement with the recess 84 of the lock plate 78 while the eject lever 70 is in a pushed state in the direction of arrow J. The lock plate 78 is maintained in a locking state by engagement between the pin 83 and the recess 84. Furthermore, since the guide roller 47 of the cassette holder 34 is disposed on the parallel portion 75a of the guide surface 75 of the eject lever 70, the cassette holder 34 is placed in a relatively high position, namely the unloading position. At this time, the aperture 90 of the cassette guide member 91 and a cassette insertion aperture 93 formed in the front panel 92 are at the same height.

In such a state, as shown in FIG. 5, if the disc cassette 96 is inserted from the recess 104 side into the cassette holder 34 through the cassette insertion aperture 93 of the front panel 92 and the aperture 90 of the cassette guide member 91, the front end face 97c of the disc cassette 96 engages the cassette engaging portion 59 of the eject arm 55 and pushes it in the cassette inserting direction. Consequently, the eject arm 55 is pivoted in the direction of arrow F in FIG. 3 about the pivot shaft 56 against the biasing force of the coil spring 58. At the same time, the unlock arm 61 of the eject arm 55 pivots in the direction of arrow F in sliding contact with the lower surface of the lock arm 63. Then, the detecting member 39 of the upper plate portion 35 is inserted into the recess 104 of the disc cassette 96 and the tip end portion of the unlock arm 61 reaches and urges the urged portion 82 of the lock plate 78 as indicated with a dot-dash line in FIG. 9, so that the lock plate 78 is pivoted in the direction of arrow L in FIG. 5 about the pivot shaft 79. This allows the recess 84 of the lock plate 78 and the engaging pin 83 to be disengaged from each other. In the event of an erroneous insertion of the disc cassette 96 into the cassette holder 34, the detecting member 39, without engaging the recess 104, abuts the front end face 97c of the disc cassette 96, so that the pivotal movement in the direction of arrow F of the eject arm 55 is prevented before the unlock lever 61 reaches the urged portion 82. In this case, therefore, the locked state of the eject lever 70 by the lock plate 78 is not released and hence the foregoing movement from the unloading position to the loading position is not performed.

Figure 8:
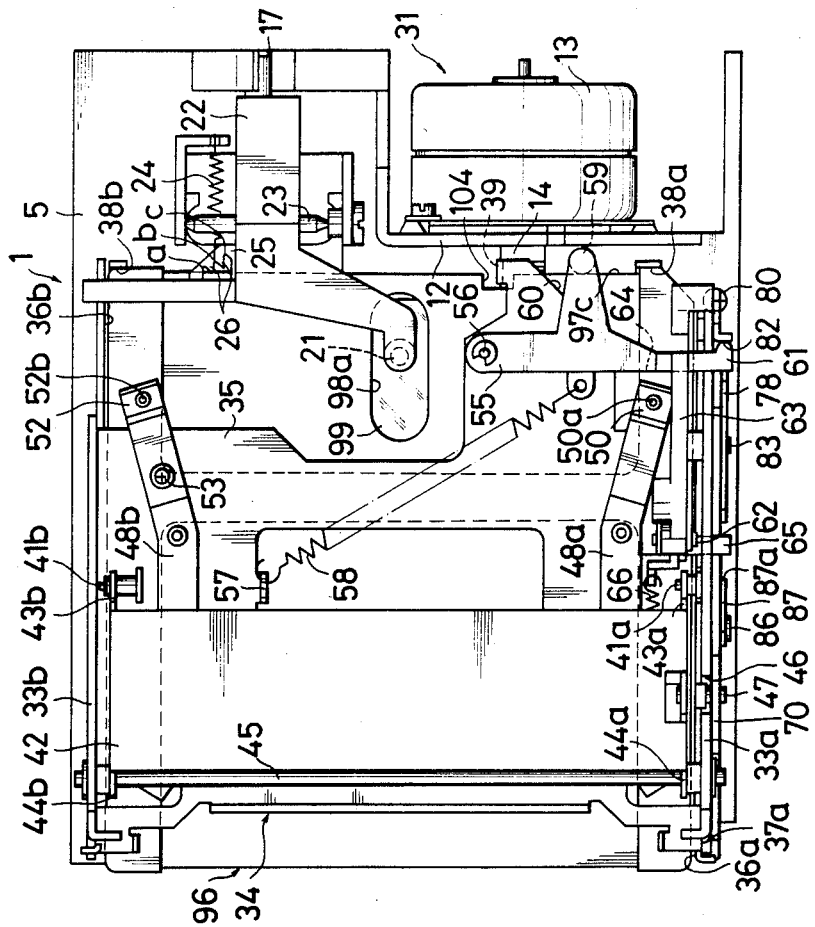
FIG. 8 is a plan view of the recording and/or reproducing apparatus showing an inserted state of the disc cassette into the cassette holder.

Immediately after release of the locked state of the eject lever 70 by the lock plate 78, the front end face 97c of the disc cassette 96 abuts the stoppers 38a and 38b. At this time, the unlock arm 61 is in a position opposed to the stepped portion 64 of the lock arm 63, and the lock arm 63 is pivoted in the direction of arrow G in FIG. 9 by the biasing force of the coil spring 66, thus allowing the stepped portion 64 of the lock arm 63 and the unlock arm 61 to be engaged into a locked state with each other (see FIGS. 8 and 9).

Figure 9:
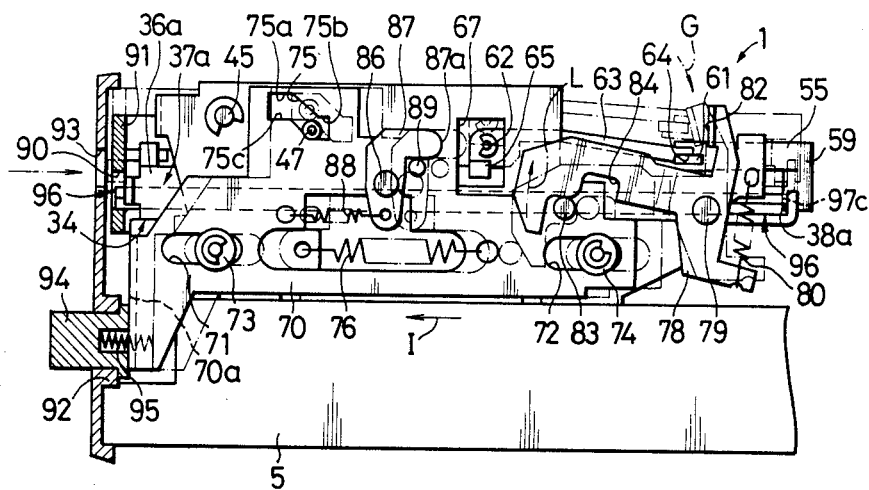
FIG. 9 is a side view of the recording and/or reproducing apparatus showing a moved state of the cassette holder from an unloading position to a loading position.

Once the lock plate 78 and the engaging pin 83 become unlocked as mentioned above, the eject lever 70 is moved in the direction of arrow I in FIG. 9 by means of the coil ring 76, so that the guide roller 47 is disposed on the parallel portion 75b of the guide surface 75 by virtue of a guiding action of the guide surface 75 of the eject lever 70 and the guide roller 47 of the cassette holder 34. As a result, the cassette holder 34 and the disc cassette 96 are moved down from the position (unloading position) indicated with a dot-dash line in FIG. 9 to the position shown in solid line (unloading position). In this case, the guide roller 47 is retained by the parallel portion 75b parallel with the chassis 5, so even if the disc cassette 96 is held with fingers and shaken up and down when the disc cassette 96 has been disposed in the loading position, there does not occur a defective chucking. Besides, the positioning of the cassette holder 34 in the loading position is effected accurately.

Before reaching the loading position, the engaging projections 49a through 52a of the plate springs 48a and 48b are in elastic pressure engagement from above with the four corners of the disc cassette 96, so that the disc cassette 96 is held between the projections 49a through 52a and bottom surfaces 105a and 105b (see FIG. 2) of the cassette holder 34.

Figure 10:
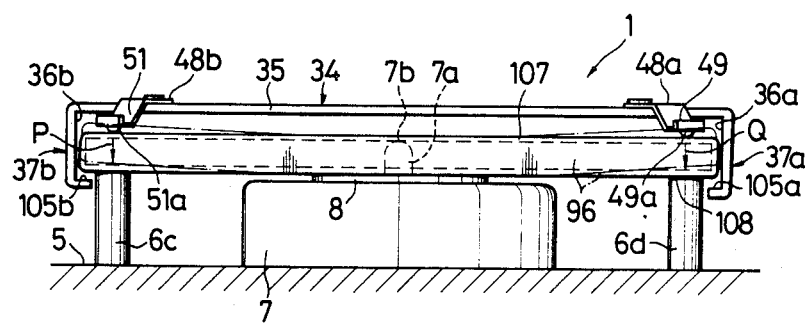
FIG. 10 is a front view schematically showing a mounted state of the disc cassette.

As the disc cassette 96 is brought down onto the loading position, it is put on the cassette receiving pins 6a through 6d and at the same time the motor shaft 7a of the flat brushless motor 7 is inserted in the motor shaft insertion aperture 101 of the core member 100 and its top portion 7b abuts the central part of the inner surface of a top plate 107 of the cassette housing 97, so that, as shown in FIG. 10, the disc cassette 96 is moved upward relative to the cassette holder 34 against the biasing force of the plate springs 48a and 48b and floats from the bottom surfaces 105a and 105b. In this case, even in case the cassette housing 97 is warped as indicated with a dot-dash line in FIG. 10, deformation of the cassette housing 97 is corrected in the directions of arrows P and Q about the top portion 7b of the motor shaft 7a by the biasing force of the plate springs 48a and 48b. As a result, a bottom plate 108 of the cassette housing 97 is brought into exact pressure contact onto the cassette receiving pins 6a–6d disposed just under the projections 49a–52a of the plate springs 48a and 48b.

At the same time, as shown in FIG. 7, the core member 100 is attracted onto the rotary disc 8 by the magnet 10 and the drive pin 9 is inserted into the drive pin insertion aperture 102 of the core member 100. On the other hand, along with descent of the cassette holder 34, the pad 21 and the magnetic head 20 are inserted in the insertion apertures 98a and 98b, respectively, of the disc cassette 96 and a part of the magnetic disc 99 is held therebetween. Then the magnetic disc 99 is rotated in a positioned state (centered state) by the motor shaft 7a and the drive pin 9 while the magnetic head 20 and the pad 21 are moved intermittently in the radial direction of the magnetic disc 99 by the track selecting mechanism 31. Consequently, concentric recording tracks are formed on the magnetic surface of the magnetic disc 99 or the information recorded on concentric tracks is reproduced.

Figure 11:
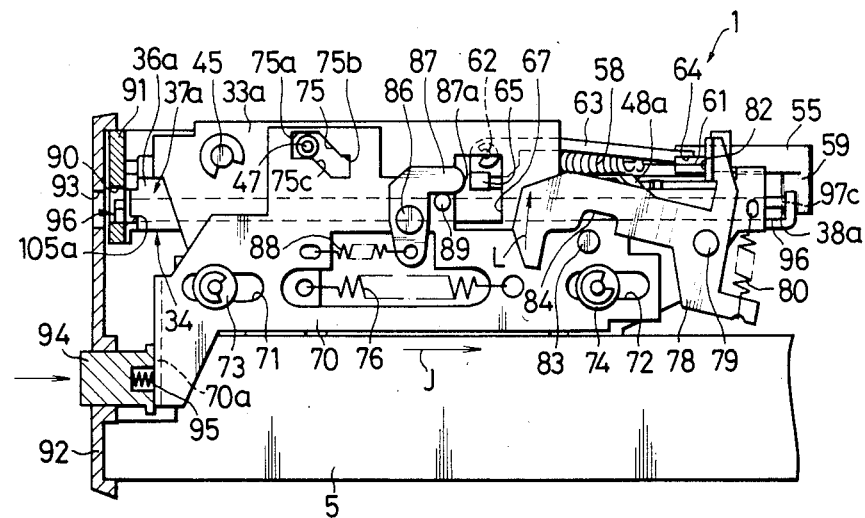
FIGS. 11 and 12 are side views of the recording and/or reproducing apparatus for illustrating an eject operation of the disc cassette.

In ejecting the disc cassette 96 from the cassette holder 34 when the eject button 94 is pushed as shown in FIG. 11, the eject lever 70 is moved in the direction of arrow J against the biasing force of the coil spring 76, so that the cassette holder 34 and the disc cassette 96 are lifted up from the loading position to the unloading position by the guiding action of the inclined portion 75c of the guide surface 75 and the guide roller 47. At the same time, the pad arm 22 is pivoted in the direction of arrow D in FIG. 1 against the biasing force of the coil spring 24, so that the pad 21 and the magnetic head 20 are disposed outside the insertion apertures 98a and 98b of the disc cassette 96.

At the time when the cassette holder 34 and the disc cassette 96 were placed in the unloading position from the loading position (when the guide roller 47 was put on the parallel portion 75a), as is apparent from FIG. 11, a tip end portion 87a of the unlock plate 87 does not abut the projection 65 of the lock arm 63 and therefore the cassette ejecting operation is not performed at this time.

Figure 12:
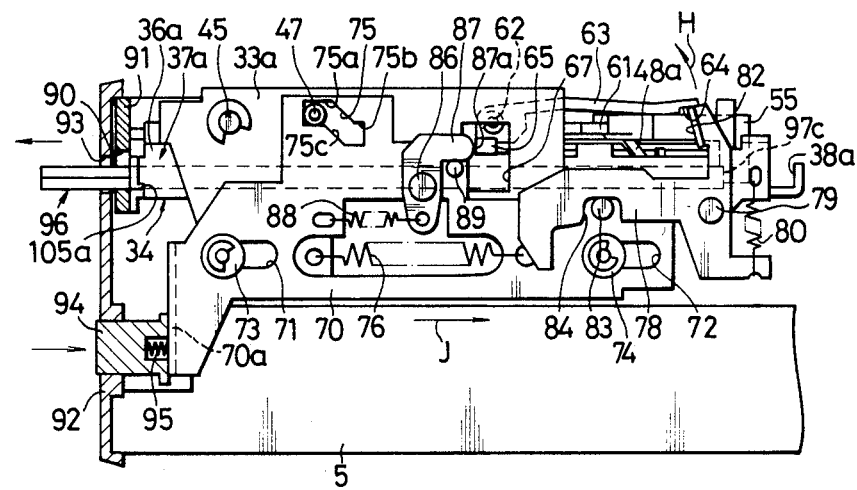

Then, as the eject button 94 is further pushed and the eject lever 70 is thereby further moved in the direction of arrow J, the tip end portion 87a of the unlock plate 87 abuts and pushes the projection 65 of the lock arm 63, so that the lock arm 63, as shown in FIG. 12, pivots in the direction of arrow H against the biasing force of the coil spring 66. In this pivotal movement, even if the lock arm 63 should strike against, for example, a cover of the drive and transducing apparatus 2, the shock of the cover is cushioned by the resilience of the coil spring 88.

Figure 13:
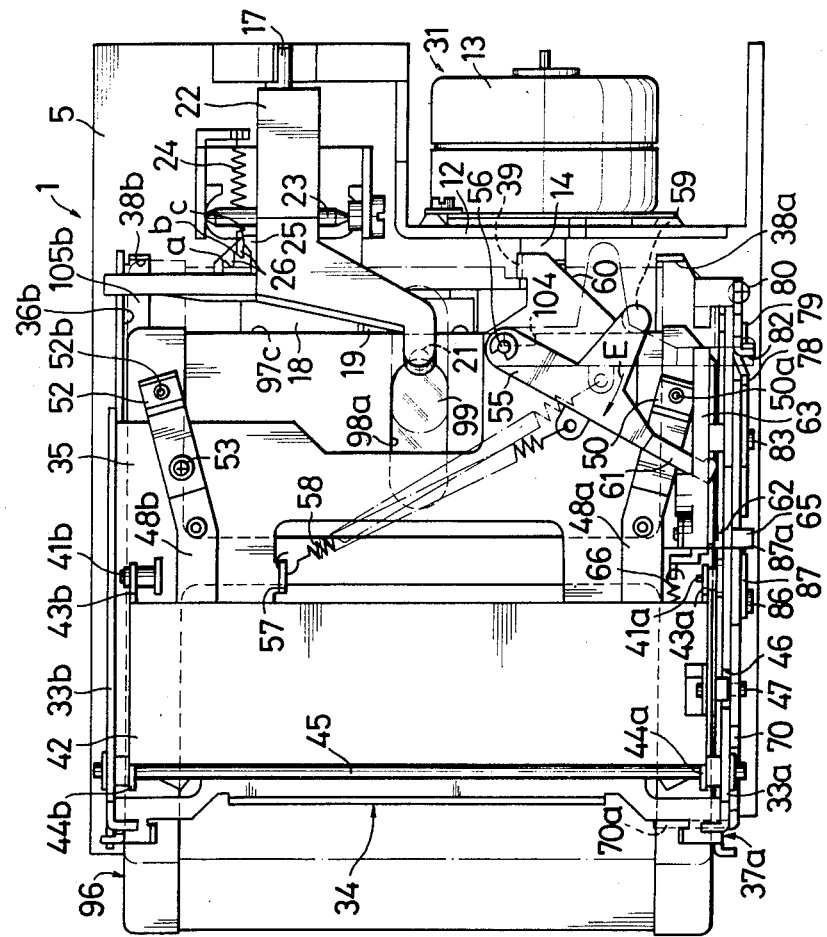
FIG. 13 is a plan view thereof.

Along with the pivotal movement in the direction of arrow H of the lock arm 63, the lock arm 63 and the eject arm 55 become unlocked from each other, thus allowing the eject arm 55 to be pivoted in the direction of arrow E by the biasing force of the coil spring 58 from the position indicated with a dot-dash line in FIG. 13 up to the position shown in solid line, so that the front end face 97c of the disc cassette 96 is urged in the cassette ejecting direction (arrow I) by the cassette engaging portion 59 and consequently the disc cassette 96 is ejected from the cassette holder 34 against the biasing force of the plate springs 48a and 48b. In this case, the spring force of the bent portion 52 of the plate spring 48b, namely the cassette pressing force of the projection 52a, is set stronger than that of the other projections 49a, 50a and 51a by adjustment of the adjusting screw 53. Consequently, the disc cassette 96 is prevented from jumping out too much from the cassette holder 34 at the time of cassette ejection. Thus, the cassette pressing force of the projection 52a acts as a moderate braking force at the time of cassette ejection.

At the time of this cassette ejecting operation, the disc cassette 96 is held in the cassette holder 34 by the pressing force of the plate springs 48a and 48b in a projected state by a suitable length from the cassette holder 34. Therefore, in the case of taking the disc cassette 96 out of the cassette holder 34, it can be drawn out easily from the cassette holder 34 by holding the above projected portion with fingers.

According to the disc cassette loading apparatus constructed as above, when the eject lever 70 is pressed, the cassette holder 34 is lifted up completely from the loading position to the unloading position. Thereafter, the eject arm 55 and the lock arm 63 are disengaged from each other, and along with the pivotal movement of the eject arm 55, the disc cassette 96 is ejected from the cassette holder 34. Thus, the ejection of the disc cassette 96 is effected after coincidence of the cassette insertion aperture 90 of the cassette guide member 91 with the cassette insertion aperture 93 of the front panel 92. Therefore it is not likely at all that the disc cassette 96 will strike against the inside surface of the front panel 92 when the cassette holder 34 is lifted up, thus permitting certain ejection of the disc cassette 96. Moreover, even if the pressing operation for the eject button 94 is stopped halfway, since the ejection of the disc cassette 96 is not started yet at this time, the disc cassette 96 will be brought down from the halfway position to the loading position while it is held in its regular position within the cassette holder 34. At this time, therefore, it is not likely that a part of the disc cassette 96 will project from the cassette insertion aperture 93 of the front panel 92 and get in between the front panel 92 and the cassette guide member 91.

Although various minor modifications may be suggested by those versed in the art, it should be understood that we wish to embody within the scope of the patent granted hereon, all such modifications as reasonably and properly come within the scope of our contribution to the art.

We claim as our invention:

1. A magnetic disc cassette loading apparatus for use with a disc drive and transducing means, comprising:
   cassette holder means for accepting a magnetic disc cassette and which is positioned over the disc drive and transducing means and moves between a loading position and unloading position relative to said disc drive and transducing means;
   a front panel cassette insertion aperture which substantially aligns with a cassette insertion aperture of the cassette holder means when the cassette holder means is in said loading position;
   eject arm means provided on said cassette holder means which engages a leading end of the disc cassette during loading and which causes said cassette holder means to begin moving from the unloading position down to the loading position only after the disc cassette is fully inserted and a trailing edge of said disc cassette clears the front panel insertion aperture, and for urging said disc cassette to be withdrawn from said cassette holder means during unloading; and
   lock arm means provided in association with said eject arm means for preventing movement of said eject arm means until said cassette holder means is raised up and said front panel insertion aperture is in substantial alignment with said cassette holder means insertion aperture.

2. A disc cassette loading apparatus according to claim 1 further comprising a slidable eject lever provided in association with said cassette holder means, said eject lever having a guide surface means for guiding said cassette holder between the loading and unloading positions.

3. A disc cassette loading apparatus according to claim 2 wherein said guide surface means of the eject lever has a loading surface, unloading surface, and slant surface therebetween, and a projection mounted on said cassette holder means being placed at said guide surface means.

4. A disc cassette loading apparatus according to claim 3 further comprising an unlock plate provided on said eject lever, said unlock plate being positioned to contact with said lock arm means after said projection of said cassette holder means is moved to the unloading surface of said guide surface means during a cassette eject operation.

5. A disc cassette loading apparatus according to claim 4 wherein said unlock plate is pivoted on said eject lever, and a coil spring is provided for urging said unlock plate towards said lock arm.

6. A disc cassette loading apparatus according to claim 3 further comprising a lock plate which holds said eject lever in an unloading position when said disc cassette is not installed in said cassette holder.

7. A magnetic disc cassette system, comprising:
   a disc drive and transducing means for driving and reading a magnetic disc cassette;
   a magnetic disc cassette loading apparatus including a holder means positioned over the disc drive and transducing means for accepting the disc cassette and which moves upwardly from a fully loaded transducing position in which the transducing means is in proximate association with the disc cassette and an unloading position above the transducing position;
   a front cassette insertion aperture which substantially aligns with a cassette insertion aperture of the cassette holder means when the cassette holder means is in said unloading position;
   eject arm means provided on the cassette holder means which a portion of the disc cassette abuts against during loading and which causes said cassette holder means to begin moving from the unloading position down to the loading position where the drive and transducing means engages the cassette only after the disc cassette is fully inserted and a trailing edge of said disc cassette will clear the front insertion aperture, and for urging the disc cassette to be withdrawn from the cassette holder means during unloading; and
   lock arm means in association with the eject arm means for preventing movement of the eject arm means until the cassette holder means is displaced to a predetermined position proximate to the unloading position so as to permit ejection of the disc cassette only after the disc cassette has substantially cleared surfaces in the cassette apparatus which would interfere with removal and is in substantial alignment with the front insertion aperture.

* * * * *